Feb. 3, 1925.

C. H. HAPGOOD

EMULSIFYING PROCESS AND MULTISTAGE EMULSIFIER

Filed Feb. 20, 1924

1,524,651

WITNESS:

INVENTOR
Cyrus Howard Hapgood
BY
Busser and Harding
ATTORNEYS.

Patented Feb. 3, 1925.

1,524,651

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

EMULSIFYING PROCESS AND MULTISTAGE EMUSIFIER.

Application filed February 20, 1924. Serial No. 694,007.

To all whom it may concern:

Be it known that I, CYRUS HOWARD HAPGOOD, a citizen of the United States, residing at Nutley, county of Essex, and State of New Jersey, have invented a new and useful Improvement in Emulsifying Processes and Multistage Emulsifiers, of which the following is a full, clear, and exact description, reference being had to the accompanying drawings, which form a part of this specification.

The object of my invention is to effect the emulsification of ingredients which are not readily emulsifiable, or which cannot be emulsified at all, in an ordinary emulsifier.

The following examples may be given of ingredients that, with ordinary emulsifiers, are difficult or impossible to emulsify:

Milk oil comprises substantially pure butter fat, or milk from which have been extracted water, casein, albumen and salts. Processes have been perfected for the manufacture of milk oil, but the successful commercial exploitation of the process is made practically impossible because of the difficulty of producing a stable emulsion of milk oil with water and milk powder.

In the manufacture of oleomargarine, great difficulty is experienced in emulsifying oleo oil, albumen and water.

By the use of my invention, permanent emulsions of the above sets of ingredients may be readily produced. Its utility, however, is not limited to the production of the particular emulsions specified.

A preferred embodiment of my multistage emulsifier is disclosed in the accompanying drawing, in which—

Figure 1:
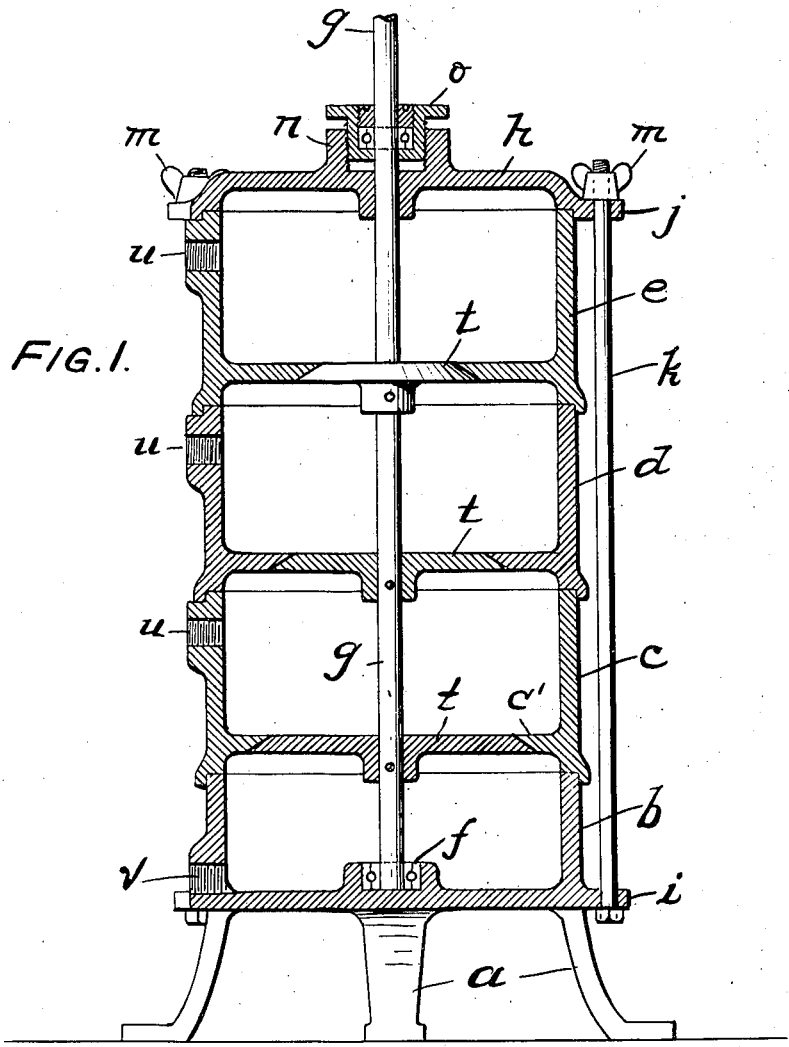
Fig. 1 is a vertical sectional view of the emulsifier.
Figure 2:
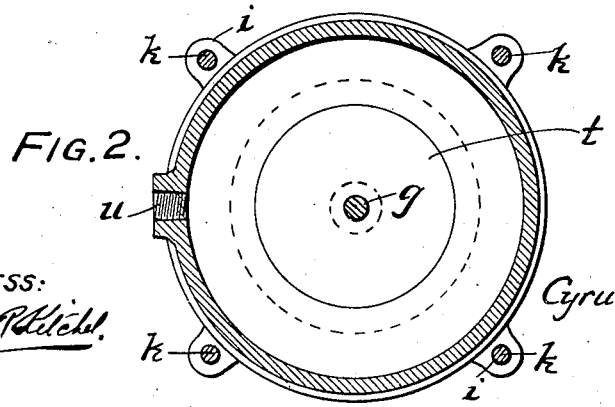
Fig. 2 is a horizontal section.

On a base $a$ is mounted a casing $b$ having an open top and a closed bottom and provided with spaced marginal lugs $i$ and a bearing $f$ for an upright shaft $g$. Mounted on casing $b$ is a shell $c$ having an open top and an inwardly extending annular flange $c'$, which provides a partition or bottom having a central orifice of great diameter. The edge of the ring flange is bevelled downward and outward at a considerable angle (say 60°) to the axis of the shaft $g$. A similar shell $d$ is mounted on shell $c$. Any number of such shells may be thus superimposed one upon another. I have shown one such additional shell ($e$). The top shell $e$ is closed by a cover $h$ through which the shaft $g$ extends. The cover $h$ is provided with marginal lugs $j$. Vertical rods $k$ connect upper lugs $j$ and lower lugs $i$. By adjusting a thumb nut $m$, the shells may be secured together liquid-tight.

The cover $h$ is provided on its upper face with an internally threaded annular projection $n$, in which is threaded a bearing $o$ adapted to support the upper end of the shaft. By adjusting this bearing, the vertical position of the shaft may be nicely adjusted.

To the shaft is secured a number of discs $t$ corresponding to the number of shell bottom orifices. Each disc is bevelled downward and outward at an angle corresponding to the bevel of the walls of the central orifices in the shells and is of a diameter corresponding to the diameter of such orifices. The shaft may be so adjusted vertically that the discs may almost register with the orifices, so as to leave an annular space between each disc and the wall of its corresponding orifice; the ordinary width of such annular space being too narrow to be accurately illustrated.

There is thus provided a vessel containing a number of compartments superimposed one upon another, adjacent compartments being closed from intercommunication except through the narrow annular space described. The wall of each shell except the lowest is provided with a threaded orifice $u$ adapted to receive the end of a pipe (not shown), which may be connected with a source of supply of one or more of the ingredients of the proposed emulsion. The wall of the lowest shell is provided with a similar threaded orifice $v$ adapted for connection with a vessel intended to receive the final emulsion.

If an emulsifiable mixture of liquids be admitted to any compartment and if the shaft be rotated at a high rate of speed, the mixture, as it flows through the narrow annular space between the rapidly rotating disc and the stationary bottom of the compartment, will be thoroughly emulsified. An emulsifier embodying this principle of construction and operation is not, however, my invention, and is not herein claimed per se.

With my multiple emulsifier, however, I have discovered that if (say) two ingredients (or one ingredient and part of another) of an emulsion of three ingredients (which are difficult or impossible to emulsify in an ordinary emulsifier) are admitted to one compartment, and are emulsified and pass to the next compartment and if into the next compartment is admitted the third ingredient, or the third ingredient and another part of the second, all three ingredients will emulsify in their passage from the second compartment to the third and the emulsion will be practically permanent. I have also discovered that in some cases, the stability of the emulsion may be increased if it is run through a third compartment into one or more other compartments if additional volumes of one or more ingredients are introduced to the third compartment.

Thus, the apparatus illustrated, with its four compartments and its three emulsifying elements, are particularly adapted to the production of a practically permanent emulsion of milk oil, milk powder and water. To make such an emulsion, I cause milk powder and water to flow (preferably by gravity) into the upper compartment, this compartment being maintained full. The milk powder and water will be thoroughly emulsified in their passage through the upper emulsifying element, forming skim milk. A mixture of milk oil and water continuously flows into the second compartment. The skim milk and milk oil will be thoroughly emulsified in their passage through the second emulsifying element, forming milk containing a considerable proportion of cream. A mixture of milk oil and water continuously flows into the third compartment. All the ingredients will thoroughly emulsify in their passage through the third emulsifying element, producing cream containing a good percentage of butter fat. The percentage of butter fat in the resultant cream may be regulated by the percentage of milk oil that is admitted to the several compartments below the top compartment. It is of distinct advantage to admit the milk oil to a succession of compartments rather than to admit it all to a single compartment.

My compound emulsifier is not only of advantage in that it effects a stable emulsion of many mixtures of ingredients that are not readily emulsifiable, but the construction is such that the process is absolutely continuous. In many cases, this continuity in the emulsifying action is essential to success.

It will be understood that the process herein claimed is not dependent for its execution on any particular construction of emulsifying apparatus. It will also be understood, that, in carrying out my process, I do not contemplate merely subjecting the same mixtures of ingredients, in the same proportions, to a succession of emulsifying operations. Such mode of operation would not produce a stable emulsion in the case of mixtures of ingredients like those herein specified. In my process, on the contrary, it is characteristic of the several successive emulsifying operations that they shall emulsify different combinations of ingredients or different proportions of the same combination of ingredients. This requirement involves the flowing of a separate stream of an ingredient, or of a mixture of ingredients, toward, and its admixture with, a previously produced emulsion. For example, in the emulsion of milk oil, milk powder and water, as preferably practiced, two of the ingredients—water and milk powder—are emulsified in the first stage: and the emulsion of these two ingredients mixed with the third ingredient—milk oil— and part of the first ingredient—water— are emulsified in the second stage; while in the third stage, although the same ingredients are emulsified as in the second stage, the proportions of the ingredients are substantially different from those of the second stage. Of course, the number of stages, the precise order of adding ingredients, and the proportions added, are variable factors even in the case of this particular emulsion; and no more precise directions need be given for this or any other desired emulsion, as the matter is one well within the skill of one versed in any particular art to which the invention may be applied.

Having now fully described my invention, what I claim and desire to protect by Letters Patent is:

1. A multi-stage emulsifier comprising a vessel provided with cross partitions forming three or more compartments, said partitions being provided with central orifices having bevelled walls, a revoluble shaft extending through said compartments, discs revoluble with the shaft and corresponding in number with said partitions and provided with bevelled peripheries spaced slightly from the bevelled walls of the respective orifices to form a plurality of separate emulsifying elements, one end compartment having an orifice for the discharge of the emulsion, while the other compartments have orifices for the admission of ingredients of the emulsion, whereby the ingredients of the emulsion may be introduced in varying combinations or proportions to a plurality of compartments, so that the successive emulsifying elements will emulsify different combinations and proportions of ingredients.

2. A multi-stage emulsifier comprising a series of three or more compartments, and emulsifiers connecting adjacent compartments, thereby permitting the continuous introduction of ingredients of the emulsion in varying combinations or proportions to all of the compartments except one end compartment and the continuous removal of the final emulsion from the last named compartment.

3. A multi-stage emulsifier comprising a lower casing having a closed bottom and an open top, a series of cylindrical-like shells mounted one upon another, said series of shells being mounted on said casing, each shell of said series having an inwardly extending ring flange bevelled along its edge, a cover mounted on the top shell, means to secure said shells and lower casing together, a revoluble shaft extending through said casing and all the shells, and discs on the shaft having bevelled edges in cooperative relation with the bevelled edges of the respecting ring flange.

4. The continuous process of emulsifying ingredients that are not readily emulsifiable, which comprises continuously conveying separate streams of ingredients toward successive loci of emulsification, emulsifying the ingredients conveyed toward the first of said loci, and emulsifying the resultant emulsion with the separate stream conveyed toward the second locus.

5. The process of emulsifying ingredients that are not readily emulsifiable, which comprises subjecting two or more ingredients to a plurality of emulsifying operations in a continuous and successive manner, and continuously adding to the progressing emulsion, between each two loci of emulsification, one or more ingredients.

6. The process of emulsifying three or more ingredients that are not readily emulsifiable, which comprises continuously conveying certain of said ingredients toward a locus of emulsification, subjecting said ingredients to an emulsifying operation, continuously conveying the emulsion resulting from said operation toward another locus while continuously mixing with said emulsion another ingredient, and subjecting to an emulsifying operation the mixture of the said emulsion and the last named ingredient.

In testimony of which invention, I have hereunto set my hand, at New York, on this 1st day of February, 1924.

CYRUS HOWARD HAPGOOD.

Witnesses:
R. R. WARREN,
G. D. TAILMAN.